US009668132B2

(12) United States Patent
Oba et al.

(10) Patent No.: US 9,668,132 B2
(45) Date of Patent: May 30, 2017

(54) COMMUNICATION CONTROL DEVICE, METHOD AND SYSTEM

(71) Applicant: Kabushiki Kaisha Toshiba, Minato-ku (JP)

(72) Inventors: Yoshihiro Oba, Kawasaki (JP); Ren Sakata, Yokohama (JP); Hiroki Kudo, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/656,150

(22) Filed: Mar. 12, 2015

(65) Prior Publication Data
US 2015/0271671 A1 Sep. 24, 2015

(30) Foreign Application Priority Data

Mar. 24, 2014 (JP) ................................ 2014-059875

(51) Int. Cl.
*H04L 9/32* (2006.01)
*H04W 12/06* (2009.01)
(Continued)

(52) U.S. Cl.
CPC ........... *H04W 12/06* (2013.01); *H04L 9/3215* (2013.01); *H04L 9/3228* (2013.01);
(Continued)

(58) Field of Classification Search
None
See application file for complete search history.

(56) References Cited

U.S. PATENT DOCUMENTS 7,478,755 B2    1/2009  Sekiguchi
2006/0242404 A1* 10/2006 Su ........................ G06Q 20/027
                                                    713/150
(Continued)

FOREIGN PATENT DOCUMENTS

JP    2006-261938    9/2006
JP    2014-93666     5/2014

OTHER PUBLICATIONS

"Transitive Trust Enrollment for Constrained Devices draft-jennings-core-transitive-trust-enrokkent-01", URL:http://tools.ietf.org/pdf/draft-jennings-core-transitive-trust-enrollment-01. pdf>, Oct. 13, 2012.

*Primary Examiner* — Brandon Hoffman
(74) *Attorney, Agent, or Firm* — Oblon, McClelland, Maier & Neustadt, L.L.P.

(57) ABSTRACT

According to an embodiment, a communication control device includes an acquisition unit, first and second authentication units, an output unit, and a connection permission unit. The acquisition unit acquires first authentication information for authenticating a communication device during initialization, via a first communication unit, from a terminal device that acquires and decodes encoded first authentication information. During initialization, the first authentication unit executes a connection authentication of the communication device via a second communication unit, based on the first authentication information. When the authentication is successful, the output unit encrypts second authentication information different from the first authentication information, and output the encrypted second authentication information to the communication device. During operation, a second authentication unit executes the connection authentication of the communication device via the second communication unit, based on the second authentication infor-
(Continued)

mation. The connection permission unit permits connection of the communication device, when the authentication is successful.

10 Claims, 7 Drawing Sheets

(51) Int. Cl.
*H04L 29/06* (2006.01)
*H04W 84/12* (2009.01)
(52) U.S. Cl.
CPC ........ *H04L 63/0838* (2013.01); *H04L 63/162* (2013.01); *H04W 84/12* (2013.01)

(56) References Cited

U.S. PATENT DOCUMENTS

| | | | |
|---|---|---|---|
| 2009/0124236 A1* | 5/2009 | Cho | H04M 1/67 455/411 |
| 2009/0164797 A1* | 6/2009 | Kramer | G06F 21/32 713/186 |
| 2013/0145446 A1* | 6/2013 | Dorso | G06F 21/43 726/6 |

* cited by examiner

FIG.8

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                             NONCE                             |
+-+-+-+-+-+-+-+-+-+-+-+-+-+-+-+-+-+-+-+-+-+-+-+-+-+-+-+-+-+-+-+-+
|                                                               |
+                                                               +
|                              TAG                              |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
| R |E|RESERVED|                                                |
+-+-+-+-+-+-+-+-+                                               +
:                             EXT                               :
:                                                               :
+                               +-+-+-+-+-+-+-+-+-+-+-+-+-+-+-+-+
|                               |
+-+-+-+-+-+-+-+-+-+-+-+-+-+-+-+-+
```

US 9,668,132 B2

COMMUNICATION CONTROL DEVICE, METHOD AND SYSTEM

CROSS-REFERENCE TO RELATED APPLICATION(S)

This application is based upon and claims the benefit of priority from Japanese Patent Application No. 2014-059875, filed on Mar. 24, 2014; the entire contents of which are incorporated herein by reference.

FIELD

An embodiment described herein relates to a communication control device, a communication control method and a communication control system.

BACKGROUND

In the system having a communication device such as home area network (HAN) equipment and a communication control device such as a home energy management system (HAMS) server, a technique for performing initialization of the communication control device has been known. For example, authentication information (credentials) including a one-time password (OTP) of the communication device and a common key are two-dimensionally encoded, and the prepared two-dimensional code is read by an introducer such as a mobile phone. Then, the introducer notifies a transfer agent on the Internet of the OTP, and sets the common key to the communication control device. Furthermore, the transfer agent notifies the communication device of the ID of the communication control device. These enable a user to save trouble of manually inputting the credentials to the communication control device.

When setting a communication control device using a transfer agent on the Internet, a communication device needs to connect to the Internet. When the communication control device is a gateway to the Internet such as a home gateway, the communication device cannot connect to the Internet unless the connection authentication with the communication control device is successful. When the communication device cannot connect to the Internet, the system of the above-described known technique does not operate. Furthermore, when the transfer agent is stolen, the common key of the communication device leaks out, thereby allowing the communication device of the third party to connect to a target network. Therefore, the safety of the system is impaired.

BRIEF DESCRIPTION OF THE DRAWINGS

FIG. 8 is a diagram illustrating a format of a PCHANNEL attribute according to the embodiment.

DETAILED DESCRIPTION

According to an embodiment, a communication control device includes an acquisition unit, a first authentication unit, an output unit, a second authentication unit, and a connection permission unit. The acquisition unit acquires first authentication information for authenticating a communication device during initialization, via a first communication unit, from a terminal device that acquires and decodes encoded first authentication information. During initialization, the first authentication unit executes a connection authentication of the communication device via a second communication unit, based on the acquired first authentication information. When the connection authentication is successful based on the first authentication information, the output unit encrypts second authentication information that is different from the first authentication information, and output the encrypted second authentication information to the communication device. During operation, a second authentication unit executes the connection authentication of the communication device via the second communication unit, based on the second authentication information. The connection permission unit permits connection of the communication device, when the connection authentication is successful.

Figure 1:
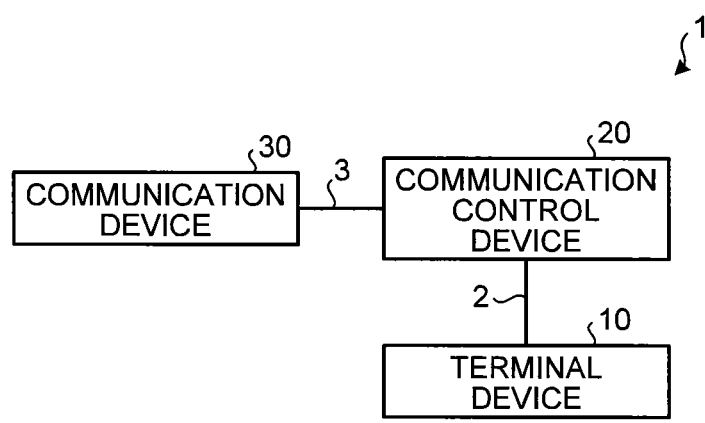
FIG. 1 is a block diagram illustrating a configuration of a communication control system according to an embodiment.

FIG. 1 is a block diagram illustrating a configuration example of a communication control system according to the embodiment. As illustrated in FIG. 1, a communication control system 1 includes a terminal device 10, a communication control device 20, and a communication device 30. Of these, the terminal device 10 and the communication control device 20 connect to a first communication media 2. The communication control device 20 and the communication device 30 connect to a second communication media 3. A plurality of communication devices 30 may be connected to the second communication media 3.

In the above-described configuration, the terminal device 10 acquires encoded first authentication information, decodes the acquired encoded first authentication information, and transmits the decoded first authentication information to the communication control device 20. Such a terminal device 10 includes a device for inputting a tag, such as a camera and a near field communication (NFC) tag reader. For example, the terminal device 10 acquires first authentication information encoded as a two-dimensional code such as a QR code (registered trademark), and a tag such as an NFC tag, using the device for inputting a tag. Then, the terminal device 10 decodes the acquired encoded first authentication information, and connects to the first communication media 2 during an initialization mode of the communication control device 20, to transmit the decoded first authentication information to the communication control device 20. The terminal device 10 may be a dedicated terminal that can read a two-dimensional code, an NFC tag and the like, and may be a mobile phone such as a smart phone equipped with a camera.

The communication control device 20 executes a connection authentication of the communication device 30, based on the first authentication information and second authentication information. For example, the communication control device 20 acquires the first authentication information from the terminal device 10, and connects to the second communication media 3 to execute the connection authentication of the communication device 30, based on the acquired first authentication information, during the initialization mode. Then, when the connection authentication based on the first authentication information is successful, the communication control device 20 encrypts the second authentication information that is different from the first authentication information, and transmits the encrypted second authentication information to the communication device 30. The communication control device 20 connects to the second communication media 3 to execute the connection authentication of the communication device 30, during a normal operation mode, based on the second authentication information. Based on these, when the connection authentication is successful, the communication control device 20 permits connection of the communication device 30. The communication control device 20 may be a home energy management system (HEMS) server, or may be relay equipment having a function such as an Access Point (AP).

The communication device 30 requests the communication control device 20 to execute the connection authentication using the first authentication information and second authentication information. For example, the communication device 30 previously retains the first authentication information, and requests the communication control device 20 to execute the connection authentication using the first authentication information, during the initialization mode. The first authentication information is assumed to be written in a nonvolatile memory of the communication device 30, when the communication device 30 is manufactured or shipped. On receipt of the encrypted second authentication information, the communication device 30 decodes the encrypted second authentication information. Then, the communication device 30 requests the communication control device 20 to execute the connection authentication using the decoded second authentication information, during the normal operation. Here, "during operation" means when the terminal device 10, the communication control device 20, the communication device 30 and the like communicate with each other except for the initialization. Based on these, when connection is permitted by the communication control device 20, the communication device 30 connects to a network such as a local area network (LAN) and the Internet via the communication control device 20. The communication device 30 may be home area network (HAN) equipment.

When the plurality of communication devices 30 is provided, the first authentication information retained by each of the communication devices 30 is unique. Therefore, the first authentication information corresponding to each of the communication devices 30 is set in the communication control device 20.

Figure 2:
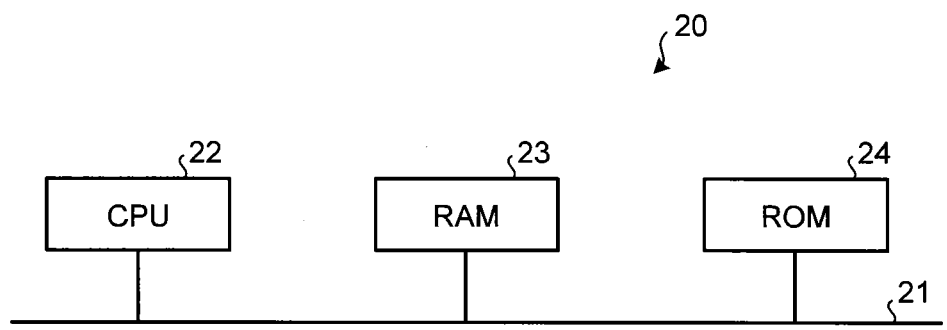
FIG. 2 is a block diagram illustrating a hardware configuration of a communication control system according to the embodiment.

FIG. 2 is a block diagram illustrating a hardware configuration example of the communication control device 20 according to the embodiment. As illustrated in FIG. 2, the communication control device 20 includes a central processing unit (CPU) 22, a random access memory (RAM) 23, and a read only memory (ROM) 24, which are connected to a bus 21. The CPU 22 centrally controls operation of the communication control device 20. The CPU 22 uses the RAM 23 as a work area, and executes a program stored in the ROM 24 and the like, thereby to control the operation of the whole of the communication control device 20.

Figure 3:
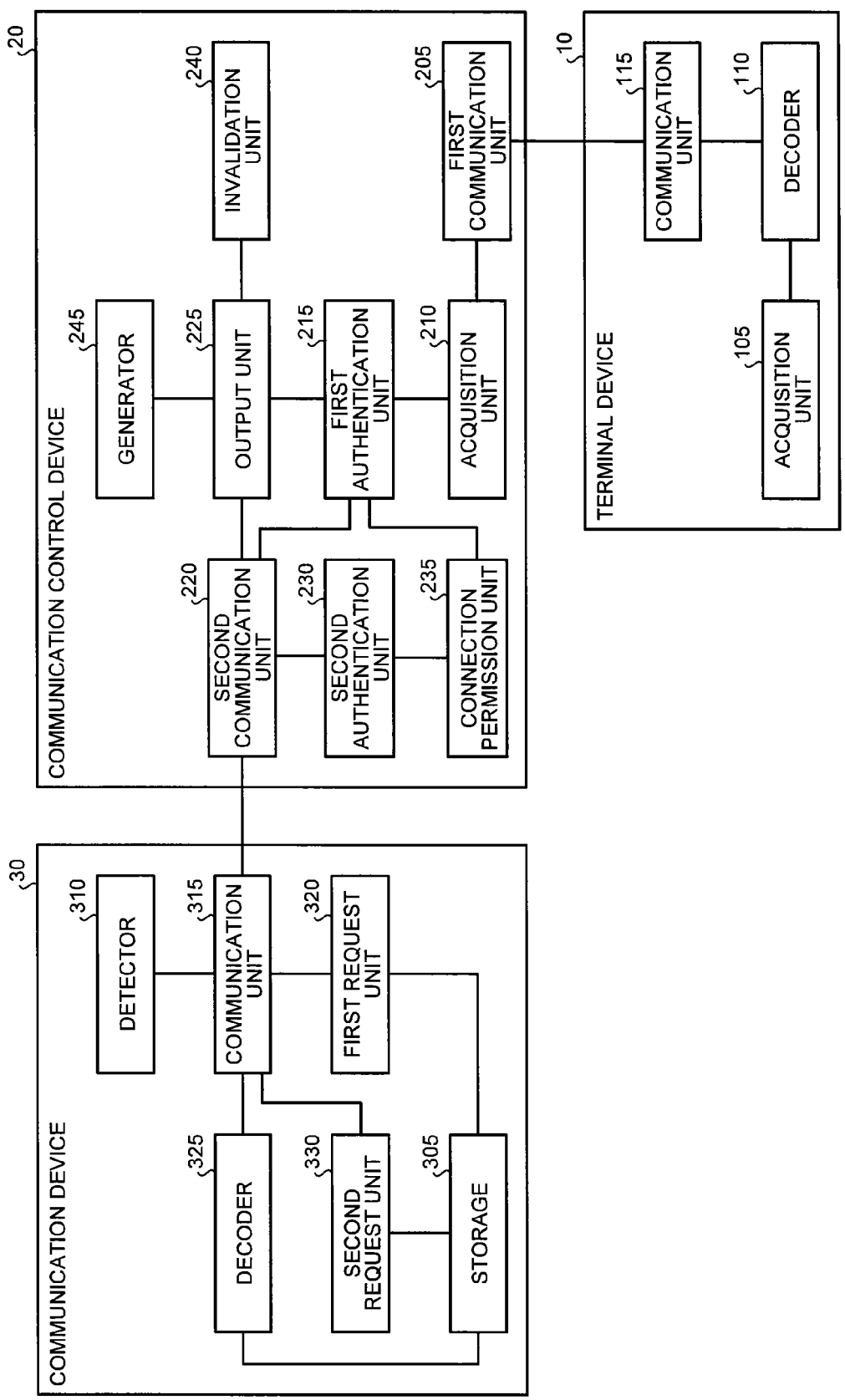
FIG. 3 is a block diagram illustrating a functional configuration of devices according to the embodiment.

FIG. 3 is a block diagram illustrating a functional configuration example of devices according to the embodiment. As illustrated in FIG. 3, the terminal device 10 includes an acquisition unit 105, a decoder 110, and a communication unit 115. A portion or all of the above-described units may be implemented by software (a program), or may be implemented by a hardware circuit.

The acquisition unit 105 acquires encoded first authentication information, using a device for inputting a tag, such as a camera and an NFC tag reader. Regarding the acquisition of the encoded first authentication information, the acquisition by the acquisition unit 105 may be performed at any time before transmitting the first authentication information to the communication control device 20. For example, the encoded first authentication information may be pasted on the surface of the body of the communication control device 20, or may be printed on the surface of an optional paper sheet or the like other than the body of the communication control device 20. A user manipulates the terminal device 10 to read the encoded first authentication information that exists on the body of the communication control device 20 or an optional location.

The decoder 110 decodes the encoded first authentication information acquired by the acquisition unit 105. Then, the decoder 110 requests the communication unit 115 to transmit the decoded first authentication information. Accordingly, the communication unit 115 connects to the first communication media 2 to detect the communication control device 20, and transmits the decoded first authentication information to the communication control device 20. The transmission of the first authentication information to the communication control device 20 is performed during the initialization mode.

Transition to the initialization mode is achieved under the below-described circumstances. For example, when the communication control device 20 or the communication device 30 is provided with a button for causing the transition to the initialization mode, the pressing of the button by user manipulation causes the transition to the initialization mode. When the communication control device 20 or the communication device 30 is provided with an infrared remote control receiver, the receipt of a command for causing the transition to the initialization mode from the infrared remote control in response to user manipulation to the infrared remote control causes the transition to the initialization mode. Besides these, the transition to the initialization mode may be achieved when the communication device 30 is powered on. The initialization mode continues for a predetermined period after the transition, or until the initialization in the initialization mode is completed.

As illustrated in FIG. 3, the communication control device 20 includes a first communication unit 205, an acquisition unit 210, a first authentication unit 215, a second communication unit 220, an output unit 225, a second authentication unit 230, a connection permission unit 235, an invalidation unit 240, and a generator 245. A portion or all of the above-described units may be implemented by software (a program), or may be implemented by a hardware circuit.

The first communication unit 205 receives the first authentication information transmitted by the terminal device 10. Accordingly, the acquisition unit 210 acquires the first authentication information received by the first communication unit 205. Then, the acquisition unit 210 outputs the acquired first authentication information to the first authentication unit 215. As described above, the transition to the initialization mode is achieved by the user manipulation to the communication control device 20 or the user manipulation to the infrared remote control. When the communication control device 20 and the terminal device 10 communicate with each other, that is, when the first authentication information is acquired from the terminal device 10, the communication control device 20 validates a dedicated network identifier and authentication information for accessing a network, during the initialization mode. In brief, the first communication media 2 between the terminal device 10 and the communication control device 20 can be used when the first authentication information is transmitted and received during the initialization mode. In other words, the first communication media 2 cannot be used except for during the initialization mode.

The first authentication unit 215 executes the connection authentication of the communication device 30 via the second communication unit 220, based on the first authentication information acquired by the acquisition unit 210, during the initialization mode. More specifically, the first authentication unit 215 receives an execution request of the connection authentication based on authentication information (the first authentication information) from the communication device 30, via the second communication unit 220, during the initialization mode. Then, the first authentication unit 215 executes the connection authentication of the communication device 30, based on the authentication information (the first authentication information) transmitted by the communication device 30, and the first authentication information acquired by the acquisition unit 210. At this time, the first authentication unit 215 outputs the result of the connection authentication, to the output unit 225 and the connection permission unit 235.

The output unit 225 encrypts the second authentication information that is different from the first authentication information, and outputs the encrypted second authentication information to the communication device 30. More specifically, when the connection authentication by the first authentication unit 215 based on the first authentication information is successful, the output unit 225 encrypts the second authentication information that is different from the first authentication information. The second authentication information is not limited unless it is identical to the first authentication information. Then, the output unit 225 transmits the encrypted second authentication information to the communication device 30 via the second communication unit 220. The output unit 225 notifies the invalidation unit 240 that the encrypted second authentication information has been transmitted to the communication device 30.

The second authentication unit 230 executes the connection authentication of the communication device 30 via the second communication unit 220, based on the second authentication information, during the normal operation mode. More specifically, the second authentication unit 230 receives an execution request of the connection authentication based on the authentication information (the second authentication information) from the communication device 30, via the second communication unit 220, during the normal operation mode. The communication device 30 has received the second authentication information encrypted and transmitted by the output unit 225, and thus performs the execution request of the connection authentication using the decoded second authentication information. Then, the second authentication unit 230 executes the connection authentication of the communication device 30, based on the authentication information (the second authentication information) transmitted by the communication device 30, and the second authentication information retained by the communication control device 20.

The connection permission unit 235 permits connection of the communication device 30 that is successful in the connection authentication. More specifically, when the connection authentication by the second authentication unit 230 based on the second authentication information is success-ful, the connection permission unit 235 permits the communication device 30 that is successful in the connection authentication, to connect to a network via the communication control device 20. When the connection authentication by the first authentication unit 215 based on the first authentication information is successful, the connection permission unit 235 may permit the communication device 30 that is successful in the connection authentication, to connect to a network via the communication control device 20.

The invalidation unit 240 invalidates the first authentication information. More specifically, when the second authentication information encrypted by the output unit 225 is transmitted to the communication device 30, the invalidation unit 240 invalidates the first authentication information. In brief, after the first authentication information is invalidated, the connection authentication based on the first authentication information comes to be in failure.

The generator 245 updates the second authentication information to generate new second authentication information. More specifically, periodically, or when the number of connection authentications using the second authentication information has reached a prescribed threshold value, the generator 245 updates the current second authentication information to generate new second authentication information. Then, the generator 245 outputs the generated second authentication information to the output unit 225. Accordingly, when new second authentication information is generated by the generator 245, the output unit 225 encrypts the new second authentication information, and transmits the encrypted new second authentication information to the communication device 30 via the second communication unit 220. The connection authentication in updating the second authentication information is performed using the current second authentication information instead of the first authentication information.

As illustrated in FIG. 3, the communication device 30 includes a storage 305, a detector 310, a communication unit 315, a first request unit 320, a decoder 325, and a second request unit 330. A portion or all of the above-described units may be implemented by software (a program), or may be implemented by a hardware circuit.

The storage 305 stores therein the first authentication information. As described above, the first authentication information stored in the storage 305 is written when the communication device 30 is manufactured or shipped. The detector 310 detects the communication control device 20. More specifically, the detector 310 broadcasts a message for detecting the communication control device 20 on the second communication media 3 via the communication unit 315, and receives a response to the broadcast, thereby to detect the communication control device 20. For example, in the detection of the communication control device 20, there is a method of using an enhanced beacon request (EBR) message and an enhanced beacon (EB) message of IEEE 802.15.4e-2012. The detector 310 broadcasts an EBR message on the second communication media 3 via the communication unit 315, and receives an EB message transmitted from an 802.15.4e-2012 compatible communication node that received the EBR message. When the EB message is received, the detector 310 detects the communication node from which the EB message has been transmitted, as the communication control device 20.

When a plurality of IEEE 802.15.4e-2012 compatible communication nodes exist near the communication device 30, the EB message may be received from each of the communication nodes. In such a case, the communication node from which an EB message containing the MAC address of the communication device 30 as initial connection destination information is transmitted may be detected as the communication control device 20. Here, when the initial connection destination information is not contained in the EB message, the communication control device 20 may be detected by assuming the communication nodes from which the EB messages are transmitted as being the candidates for the communication control device 20, attempting the connection authentication to each of the candidates, and thus finding a candidate that is successful in the connection authentication.

The first request unit 320 requests the communication control device 20 to execute the connection authentication using the first authentication information. More specifically, the first request unit 320 requests the communication control device 20 detected by the detector 310 to execute the connection authentication using the first authentication information stored in the storage 305, via the communication unit 315, during the initialization mode in which the second authentication information is not retained.

The decoder 325 decodes the encrypted second authentication information. More specifically, the decoder 325 receives the encrypted second authentication information from the communication control device 20 via the communication unit 315, decodes the encrypted second authentication information, and stores the decoded second authentication information in the storage 305.

The second request unit 330 requests the communication control device 20 to execute the connection authentication using the second authentication information. More specifically, the second request unit 330 requests the communication control device 20 detected by the detector 310 to execute the connection authentication using the second authentication information stored in the storage 305, via the communication unit 315, during the normal operation mode in which the second authentication information is retained.

Figure 4:
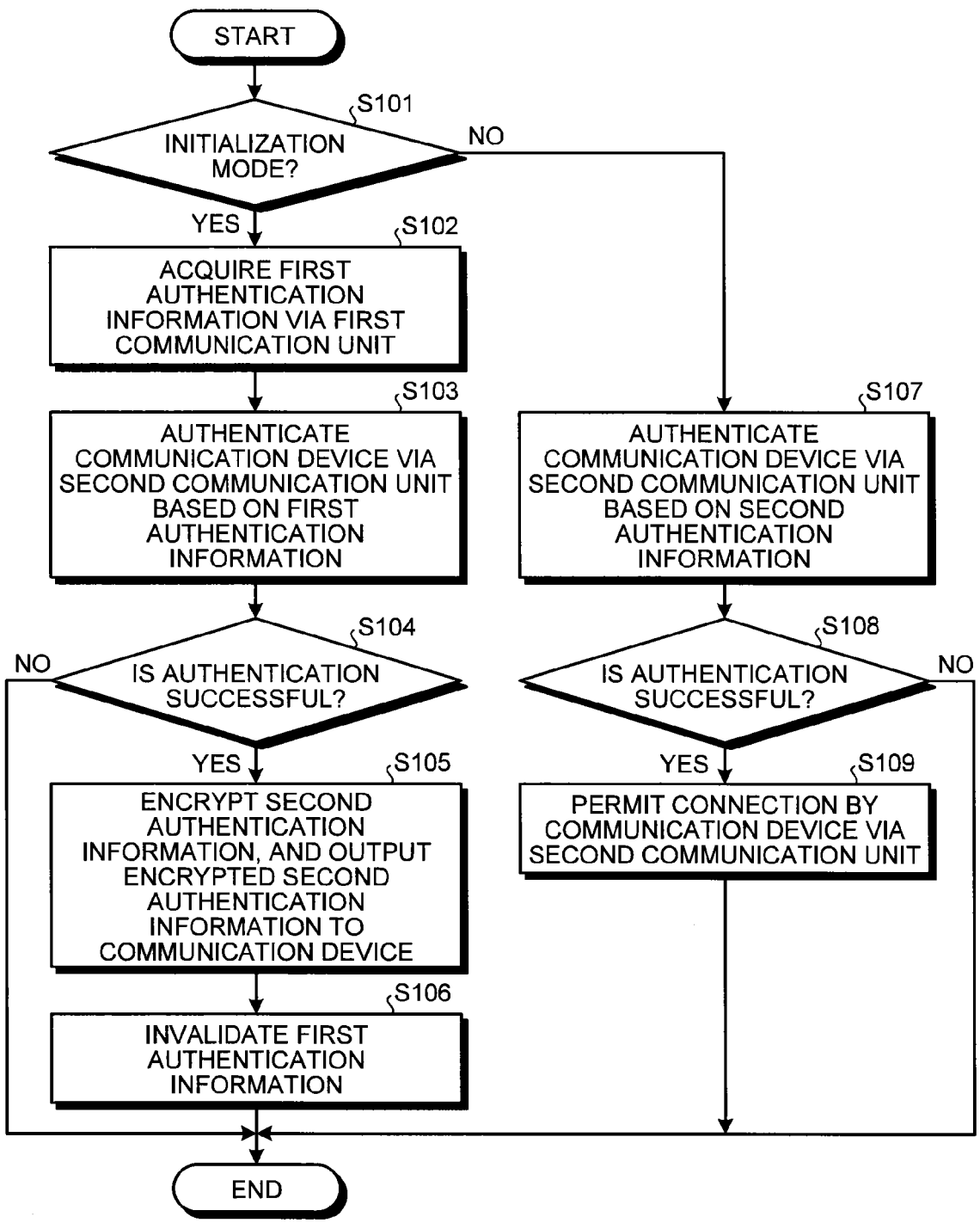
FIG. 4 is a flow chart illustrating a flow of a communication control process according to the embodiment.

Next, with reference to FIG. 4, a flow of a communication control process according to the first embodiment will be described. FIG. 4 is a flow chart illustrating a flow example of the communication control process according to the embodiment. The communication control process mainly refers to the process performed by the communication control device 20.

As illustrated in FIG. 4, in a state of the initialization mode (step S101: Yes), the acquisition unit 210 acquires the first authentication information from the terminal device 10 via the first communication unit 205 (step S102). The first authentication unit 215 executes the connection authentication of the communication device 30 via the second communication unit 220, based on the first authentication information acquired by the acquisition unit 210 (step S103).

At this time, when the connection authentication by the first authentication unit 215 is successful (step S104: Yes), the output unit 225 encrypts the second authentication information that is different from the first authentication information, and transmits the encrypted second authentication information to the communication device 30 via the second communication unit 220 (step S105). On the other hand, when the connection authentication by the first authentication unit 215 is in failure (step S104: No), the process terminates without permitting the connection of the communication device 30. After the second authentication information is output by the output unit 225, the invalidation unit 240 invalidates the first authentication information (step S106).

In a state of the normal operation mode instead of the initialization mode (step S101: No), the second authentication unit 230 executes the connection authentication of the communication device 30 via the second communication unit 220, based on the second authentication information (step S107). At this time, when the connection authentication by the second authentication unit 230 is successful (step S108: Yes), the connection permission unit 235 permits the connection by the communication device 30 via the second communication unit 220 (step S109). On the other hand, when the connection authentication by the second authentication unit 230 is in failure (step S108: No), the process terminates without permitting the connection of the communication device 30.

Figure 5:
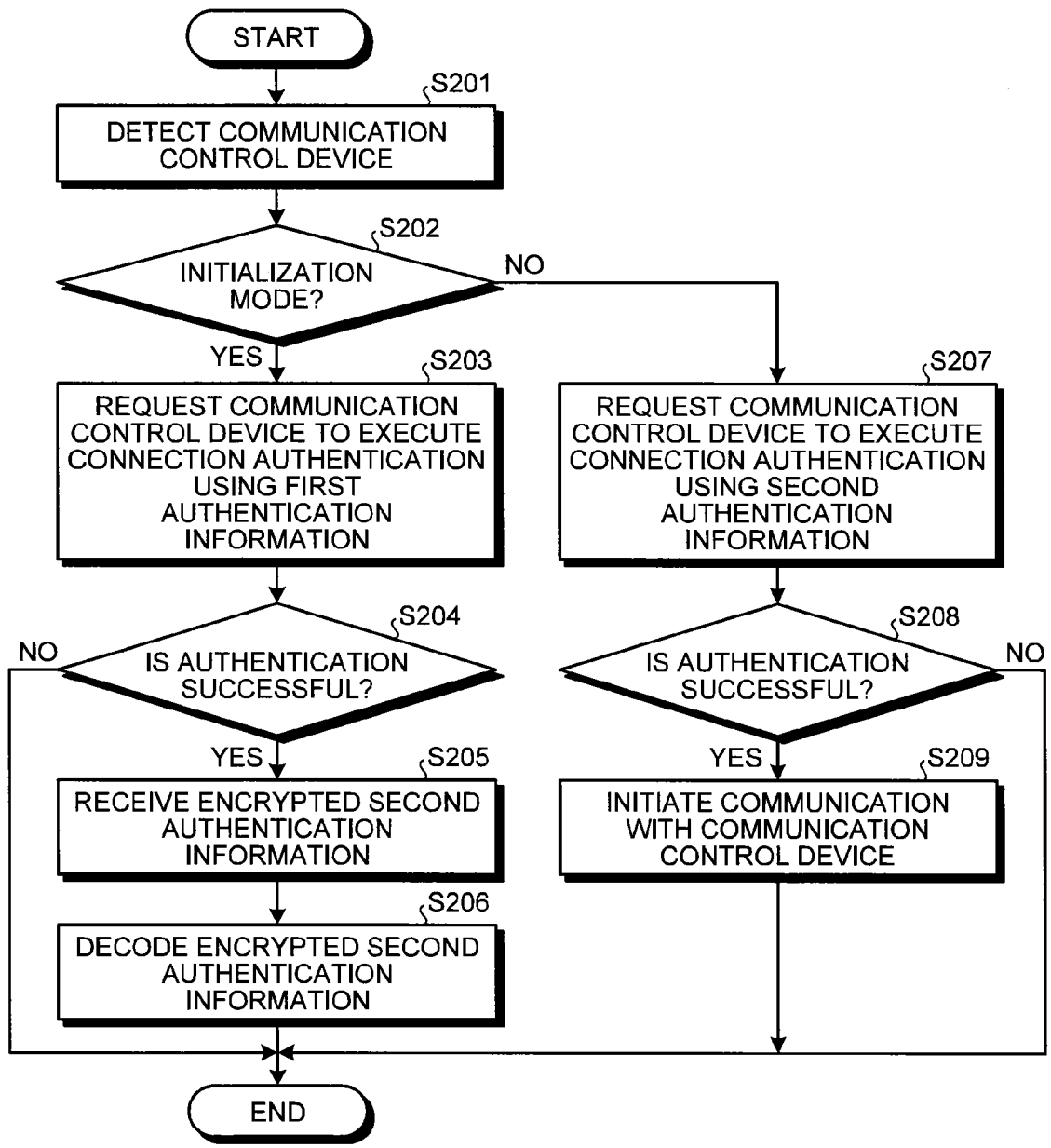
FIG. 5 is a flow chart illustrating a flow of a communication process according to the embodiment.

Next, with reference to FIG. 5, a flow of a communication process according to the embodiment will be described. FIG. 5 is a flow chart illustrating a flow example of the communication process according to the embodiment. The communication process mainly refers to the process performed by the communication device 30.

As illustrated in FIG. 5, the detector 310 broadcasts an EBR message or the like via the communication unit 315, and receives an EB message, thereby to detect the communication control device 20 (step S201). Then, in a state of the initialization mode (step S202: Yes), the first request unit 320 requests the communication control device 20 detected by the detector 310 to execute the connection authentication using the first authentication information stored in the storage 305 (step S203).

At this time, when the connection authentication using the first authentication information is successful (step S204: Yes), the communication unit 315 receives the encrypted second authentication information from the communication control device 20 (step S205). On the other hand, when the connection authentication using the first authentication information is in failure (step S204: No), the process terminates without permitting the connection. Then, the decoder 325 decodes the encrypted second authentication information, and stores the decoded second authentication information in the storage 305 (step S206).

In a state of the normal operation mode instead of the initialization mode (step S202: No), the second request unit 330 requests the communication control device 20 detected by the detector 310 to execute the connection authentication using the second authentication information stored in the storage 305 (step S207). At this time, when the connection authentication using the second authentication information is successful (step S208: Yes), the connection is permitted, thereby enabling the communication with the communication control device 20 to be initiated (step S209). On the other hand, when the connection authentication using the second authentication information is in failure (step S208: No), the process terminates without permitting the connection.

Figure 6:
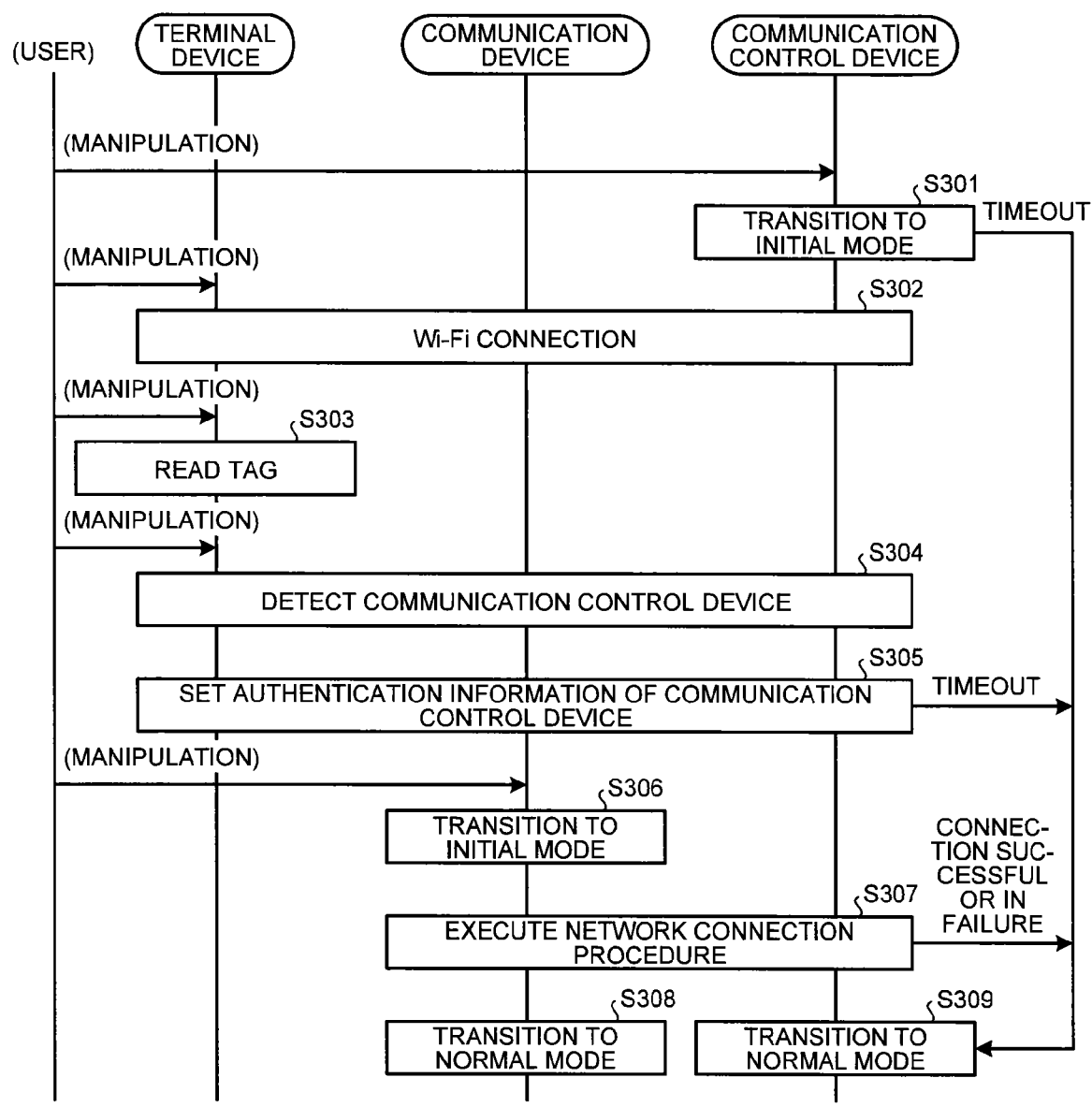
FIG. 6 is a sequence diagram illustrating a flow of an entire process according to the embodiment.

Next, with reference to FIG. 6, a flow of an entire communication process according to the embodiment will be described. FIG. 6 is a sequence diagram illustrating a flow example of the entire process according to the embodiment. In FIG. 6, a case of using IEEE 802.15.4e MAC (hereinafter, referred to as LR-WPAN) used in a Wi-SUN ECHONET-Lite HAN profile or the like as the second communication media 3 will be described as an example. Similarly, a case of using IEEE 802.11 (hereinafter, referred to as Wi-Fi) as the first communication media 2 will be described as an example. Similarly, a case of using ECHONET-Lite compatible HAN equipment as the communication device 30, using a HEMS server as the communication control device 20, and using a smart phone as the terminal device 10 will be described as an example. The communication control device 20 has a function as a Wi-Fi access point on the first communication media 2.

As illustrated in FIG. 6, the communication control device 20 transits to the initialization mode in response to user manipulation (step S301). The terminal device 10 connects to the communication control device 20 via Wi-Fi in response to user manipulation (step S302). Then, the terminal device 10 reads, in response to user manipulation, the first authentication information encoded as a QR code (registered trademark) or an NFC tag using a device for inputting a tag, and decodes the read encoded first authentication information (step S303). The encoded first authentication information may be read before performing the processes in step S301 and step S302.

Subsequently, the terminal device 10 detects, in response to user manipulation, the communication control device 20 on Wi-Fi (step S304). In the detection of the communication control device 20, Universal Plug and Play (UPnP) may be used, or a broadcasting function based on ECHONET-Lite may be used. Thereafter, the terminal device 10 connects to the detected communication control device 20 in an application layer via Wi-Fi, and transmits the decoded first authentication information, while the communication control device 20 sets the first authentication information (step S305). As an application protocol for setting the first authentication information, HTTP or HTTPS may be used.

The communication device 30 transits, in response to user manipulation, to the initialization mode (step S306). The communication device 30 may transit to the initialization mode when the communication device 30 is powered on. The process in step S306 can be executed independently of the processes in step S302 to step S305. Then, the communication device 30 executes the network connection procedure based on ECHONET-Lite on LR-WPAN, with the communication control device 20, using the first authentication information (step S307). At this time, as a network access authentication protocol used in the network connection procedure, Protocol for carrying Authentication for Network Access (PANA) defined in RFC 5191 is used. As an authentication algorithm of the Extensible Authentication Protocol (EAP) executed in PANA, EAP-PSK defined in RFC 4764 is used. In the process of step S307, when the execution of the network connection procedure is successful, the second authentication information is also distributed.

When the execution of the network connection procedure is successful, the communication device 30 transits to the normal operation mode (step S308). When the execution of the network connection procedure is successful, the communication control device 20 transits to the normal operation mode (step S309). The transition to the normal operation mode may be performed when a certain period of time has elapsed after the initiation of the initialization mode or the initiation of the execution of the network connection procedure. In step S301 and step S305, the transition to the normal operation mode is also performed when a prescribed period of time has elapsed (at a timeout). In step S307, the transition to the normal operation mode is performed when the connection is either successful or in failure.

The service set identifier (SSID) that is a Wi-Fi network identifier advertised by a beacon from the communication control device 20 during the initialization mode may be the same as the SSID during the normal operation mode, or may be an SSID specific to the initialization mode. For example, the SSID specific to the initialization mode is ECHONET-INIT or the like. When the SSID varies between during the normal operation mode and during the initialization mode, a different network access residential (for example, PSK of WPA-PSK) is used for the SSID during each mode. When the SSID is identical between during the normal operation mode and during the initialization mode, the above-described process in step S301 is not required. At this time, the communication control device 20 may transit to the initialization mode in the process of step S305.

Figure 7:
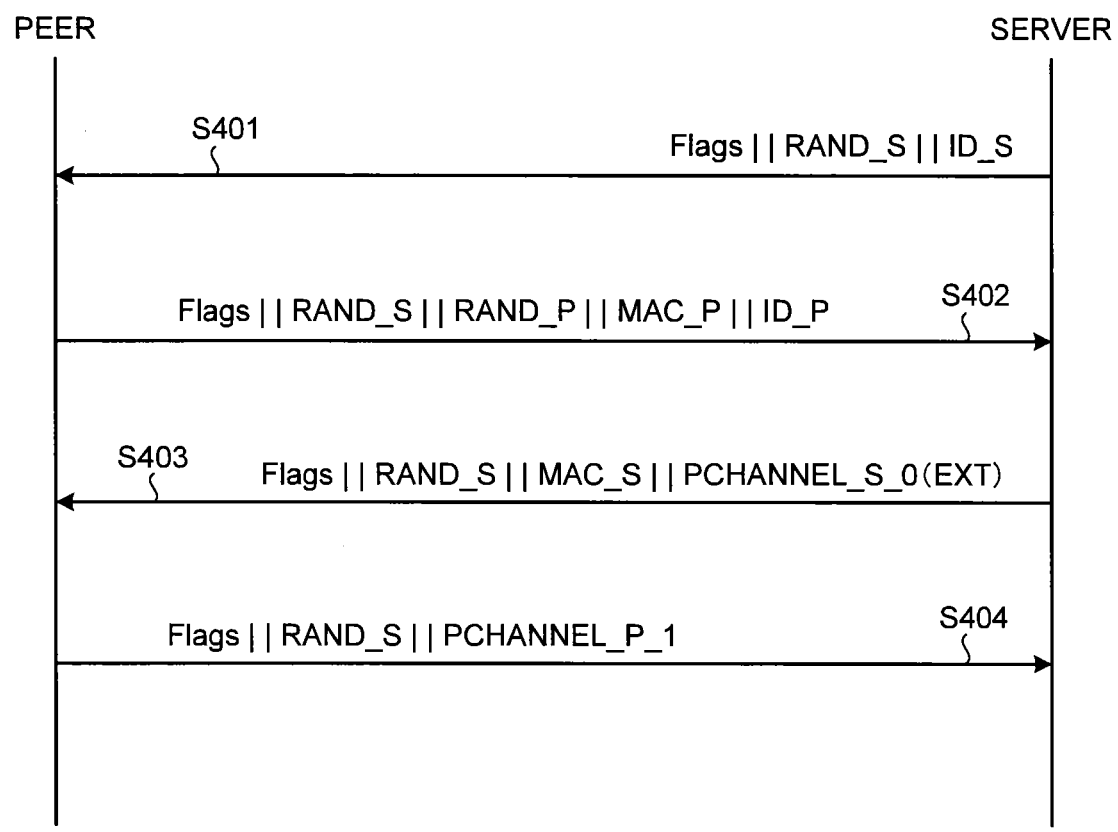
FIG. 7 is a sequence diagram explaining an EAP-PSK authentication algorithm according to the embodiment.

Next, with reference to FIG. 7, a flow of an EAP-PSK authentication algorithm according to the embodiment will be described. FIG. 7 is a sequence diagram illustrating a flow example of the EAP-PSK authentication algorithm according to the embodiment. In FIG. 7, the server is an EAP authentication server; and the peer is an EAP authentication peer. For example, the EAP authentication server is implemented in the communication control device 20; and the EAP authentication peer is implemented in the communication device 30.

As illustrated in FIG. 7, the server (the communication control device 20) transmits an EAP-PSK #1 message to the peer (the communication device 30) (step S401). Then, the peer (the communication device 30) transmits an EAP-PSK #2 message to the server (the communication control device 20) (step S402). Subsequently, the server (the communication control device 20) transmits an EAP-PSK #3 message to the peer (the communication device 30) (step S403). Thereafter, the peer (the communication device 30) transmits an EAP-PSK #4 message to the server (the communication control device 20) (step S404).

The EAP-PSK #1 message contains fields of flag (Flags), server random number (RAND_S), and server ID (ID_S). The EAP-PSK #2 message contains fields of flag (Flags), server random number (RAND_S), peer random number (RAND_P), peer message authentication code (MAC_P), and peer ID (ID_P). The EAP-PSK #3 message contains fields of flag (Flags), server random number (RAND_S), server message authentication code (MAC_S), and server PCHANNEL (PCHANNEL_S). The EAP-PSK #4 message contains fields of flag (Flags), server random number (RAND_S), and peer PCHANNEL (PCHANNEL_P).

Of these, ID_P contains a portion of the first authentication information. EXT contains a portion of the encrypted second authentication information. Whether or not PCHANNEL_S contains EXT may be determined depending on the value of ID_P. In brief, a certain value of ID_P may inhibit EXT from being contained in PCHANNEL_S. These enable the communication device 30 that does not support the second authentication information to also perform the connection authentication using the first authentication information during the normal operation mode.

FIG. 8 is a diagram illustrating a format example of a PCHANNEL attribute according to the embodiment. For example, the PCHANNEL attribute is an attribute that is defined by RFC 4764 and is used as PCHANNEL_P and PCHANNEL_S.

In FIG. 8, Nonce represents a random number; Tag represents a message authentication code; and R represents an authentication result notification. For example, the authentication result notification becomes "01: Authentication continued", "10: Authentication successful", or "11: Authentication in failure". Also, E represents an extension instruction; Reserved represents a reservation field; and EXT represents an extension field. E=1 indicates that the EXT field is contained; and E=0 indicates that the EXT field is not contained. EXT is constituted by a variable-length extension payload that follows a 1-octet extension type. All of the fields of R and thereafter in PCHANNEL are encrypted.

Next, the configurations of the first authentication information and the second authentication information will be described. In the present embodiment, the first authentication information is constituted by a three-tuple (device ID, device password, and PSK). Similarly, the second authentication information is constituted by a pair (device ID and PSK). The device ID is constituted by a four-tuple (credential type, credential version, vendor specific field, and MAC address), and has the format below. Here, "+" is an operator representing linkage between character strings.

Device ID=credential type+credential version+vendor specific field+MAC address

The credential type is a 1-octet value, and distinguishes between the HAN and other networks. For example, in a case of the HAN, the credential type is "0x01". The credential version is a 1-octet value, and indicates the first authentication information or the second authentication information. Credential version=0x00 indicates the first authentication information, and the others indicate the second authentication information. The vendor specific field is a 2-octet value, and has semantics which varies depending on the vendor. The MAC address is an 8-octet value, and accommodates an EUI-64 MAC address of HAN equipment.

The device password is a common key having not less than 12 octets and not more than 22 octets and being constituted by ASCII alphabetic characters. The pre-shared key (PSK) is a 16-octet value, and a common key used in the EAP-PSK. The PSK is calculated from the device password "PWD" as below.

PSK=LSBytes16(SHA-256(PWD))

Here, LSBytes16(x) is a function that returns the lower 16 octets of octet sequence x. SHA-256(y) is a function that returns an octet sequence in which a Secure Hash Algorithm SHA-256 is applied to octet sequence y.

The information to be encoded as a QR code (registered trademark) or an NFC tag, of the information contained in the first authentication information, is the MAC address and the device password, and is encoded as below.

MAC address+'/'+device password

When the value of a tag is transformed into a character, and printed in ASCII code on a paper surface, the output is in the following format.

Base 16 notation of MAC address+'/'+ASCII character string of device password
For example, "9876543210FEDCBA/0123456789AB-CDEF"

In the sequence illustrated in FIG. 6, when the EAP-PSK is used as an authentication algorithm for the connection authentication, the ID of HAN equipment contained in authentication client identifier ID_P and the ID of HEMS contained in authentication server identifier ID_S have the following format.

ID of HAN equipment="HAN-DEV"+hexadecimal notation of device ID

ID of HEMS="HAN-CTRL"+hexadecimal notation of MAC address of HEMS

The information encrypted as a portion of the second authentication information in an extension payload portion of the EXT field of PCHANNEL_S is encoded as below. At this time, the value of the extension type field of EXT is assumed to be 0x01.

Credential version+PSK

When the second authentication information is updated, the credential version value is incremented like, for example, 0x01, 0x02, 0x03 and so on, for each update of the authentication information. As described above, the update of the second authentication information may be periodically performed, or may be performed when the number of connection authentications using the second authentication information reaches a threshold value. The update procedure of the second authentication information is performed by executing the connection authentication, in a similar manner to when the second authentication information is initially distributed.

An example of the case in which whether or not EXT is contained in PCHANNEL_S, that is, whether or not the second authentication information is distributed, is determined according to the value of ID_P will be described, based on an assumption that ID_P contains the ID of HAN equipment; the ID of HAN equipment contains the device ID; and the device ID contains the vendor specific field. At this time, the vendor specific field can be used to determine whether or not PCHANNEL_S contains EXT. For example, it is controlled that if vendor specific field=0x0001, PCHANNELS contains EXT, and otherwise PCHANNEL_S does not contain EXT.

According to the present embodiment, the initialization of the authentication information (first authentication information) can be simply performed, without connecting to the Internet, before the communication device 30 connects to the communication control device 20. When the connection authentication is successful during the initialization mode, a new authentication information (the second authentication information) is distributed, and the new authentication information is used in the subsequent communication. Therefore, even if the authentication information (first authentication information) for initialization is leaked to the third party, the communication can be safely performed, and the security of the system improves. The use of an SSID specific to the initialization mode inhibits the manager from knowing the Wi-Fi credential regarding the SSID of the normal operation mode, even when the initialization is performed by the manager. Therefore, the security of the system is maintained, while the convenience during the initialization improves.

The process procedures, control procedures, specific names, and information including various types of data and parameters illustrated in the above-described document and in the drawings can be optionally modified, except otherwise noted. The constituents of the control device illustrated in the drawings are functionally conceptual, and do not necessarily need to be physically configured as illustrated in the drawings. That is, a specific form of dispersion and integration of the devices is not be limited to that illustrated in the drawings, and all or a portion of the devices can be functionally or physically dispersed and integrated in an optional unit, depending on various loads, use circumstances and the like.

For example, the first request unit 320 and the second request unit 330 may be integrated as a "request unit" that requests the connection authentication using the first authentication information when the second authentication information is not stored in the storage 305, and requests the connection authentication using the second authentication information when the second authentication information is stored in the storage 305. The first authentication unit 215 and the second authentication unit 230, each using different authentication information but having similar process content, may be integrated as an "authentication unit".

The communication control device according to the above-described embodiment can be achieved by, for example, using a general-purpose computer device as basic hardware. The program to be executed has a module configuration containing the above-described functions. The program may be provided by being recorded in a computer-readable recording medium such as a CD-ROM, a CD-R and a DVD as a file having an installable format or an executable format, or may be provided by being previously incorporated into a ROM or the like.

While certain embodiment has been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A communication control device, comprising:
   an acquisition unit to acquire first authentication information for authenticating a communication device during initialization, via a first communication unit, from a terminal device that acquires and decodes encoded first authentication information;
   a first authentication unit to, during initialization, execute a connection authentication of the communication device that previously retains the first authentication information, via a second communication unit, based on the acquired first authentication information;
   a generator to, when the connection authentication is successful based on the first authentication information, generate second authentication information that is different from the first authentication information;
   an output unit to encrypt the generated second authentication information and output the encrypted second authentication information to the communication device that is successful in the connection authentication based on the first authentication information;
   a second authentication unit to, during operation, execute a connection authentication of the communication device via the second communication unit, based on the second authentication information; and
   a connection permission unit to permit connection of the communication device, when the connection authentication is successful based on the second authentication information.

2. The device according to claim 1, further comprising an invalidation unit to invalidate the first authentication information, when the encrypted second authentication information is output to the communication device.

3. The device according to claim 1, wherein the generator updates the second authentication information to generate new second authentication information, wherein
   the output unit encrypts the new second authentication information, and outputs the encrypted new second authentication information to the communication device, and
   the second authentication unit executes the connection authentication based on the new second authentication information.

4. The device according to claim 1, wherein the output unit outputs the encrypted second authentication information to the communication device, using an extension field of a PCHANNEL attribute of EAP-PSK.

5. The device according to claim 1, wherein
   the first communication unit is an IEEE 802.11 interface, and
   the second communication unit is an IEEE 802.15.4 interface.

6. The device according to claim 1, wherein the first communication unit and the second communication unit use an identical type of communication medium.

7. The device according to claim 1, wherein when the first authentication information is acquired from the terminal device, a dedicated network identifier and authentication information for network access are validated for the first communication unit, during a prescribed certain period during a mode period for acquiring the first authentication information.

8. A communication control method, comprising:
   acquiring first authentication information for authenticating a communication device during initialization, via a first communication unit, from a terminal device that acquires and decodes encoded first authentication information;
   executing, during initialization, a connection authentication of the communication device that previously retains the first authentication information, via a second communication unit, based on the acquired first authentication information;
   generating, when the connection authentication is successful based on the first authentication information, second authentication information that is different from the first authentication information;
   encrypting the generated second authentication information and outputting the encrypted second authentication information to the communication device that is successful in the connection authentication based on the first authentication information;
   executing, during operation, a connection authentication of the communication device via the second communication unit, based on the second authentication information; and
   permitting connection of the communication device, when the connection authentication is successful based on the second authentication information.

9. A communication control system including a communication control device and a communication device,
   the communication control device comprising:
   an acquisition unit to acquire first authentication information for authenticating the communication device during initialization, via a first communication unit, from a terminal device that acquires and decodes encoded first authentication information;
   a first authentication unit to, during initialization, execute a connection authentication of the communication device that previously retains the first authentication information, via a second communication unit, based on the acquired first authentication information;
   a generator to, when the connection authentication is successful based on the first authentication information, generate second authentication information that is different from the first authentication information;
   an output unit to encrypt the generated second authentication information and output the encrypted second authentication information to the communication device that is successful in the connection authentication based on the first authentication information;
   a second authentication unit to, during operation, execute a connection authentication of the communication device via the second communication unit, based on the second authentication information; and a connection permission unit to permit connection of the communication device, when the connection authentication is successful based on the second authentication information, the communication device comprising:

a storage to store therein the first authentication information;

a detector to detect the communication control device;

a first request unit to, during initialization, request the detected communication control device to execute the connection authentication using the first authentication information stored in the storage;

a decoder to, on receipt of the encrypted second authentication information from the communication control device, decode the encrypted second authentication information; and a second request unit to, during operation, request the detected communication control device to execute the connection authentication using the decoded second authentication information.

10. A communication control system including a terminal device, a communication control device and a communication device, the terminal device comprising:

an acquisition unit to acquire an encoded first authentication information for authenticating the communication device during initialization;

a decoder to decode the encoded first authentication information; and a communication unit to transmit the decoded first authentication information to the communication control device, the communication control device comprising:

an acquisition unit to acquire the decoded first authentication information via a first communication unit;

a first authentication unit to, during initialization, execute a connection authentication of the communication device that previously retains the first authentication information, via a second communication unit, based on the acquired first authentication information;

a generator to, when the connection authentication is successful based on the first authentication information, generate second authentication information that is different from the first authentication information;

an output unit to encrypt the generated second authentication information and output the encrypted second authentication information to the communication device that is successful in the connection authentication based on the first authentication information;

a second authentication unit to, during operation, execute a connection authentication of the communication device via the second communication unit, based on the second authentication information; and a connection permission unit to permit connection of the communication device, when the connection authentication is successful based on the second authentication information, the communication device comprising:

a storage to store therein the first authentication information;

a detector to detect the communication control device;

a first request unit to, during initialization, request the detected communication control device to execute the connection authentication using the first authentication information stored in the storage;

a decoder to, on receipt of the encrypted second authentication information from the communication control device, decode the encrypted second authentication information; and a second request unit to, during operation, request the detected communication control device to execute the connection authentication using the decoded second authentication information.

* * * * *